(12) United States Patent
Minadeo et al.

(10) Patent No.: US 9,777,704 B2
(45) Date of Patent: Oct. 3, 2017

(54) ROTOR BLADE ASSEMBLY FOR A WIND TURBINE HAVING VARIABLE-LENGTH BLADE BOLTS

(71) Applicant: General Electric Company, Schenectady, NY (US)

(72) Inventors: Adam Daniel Minadeo, Greenville, SC (US); William Max Gobeli, Simpsonville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 373 days.

(21) Appl. No.: 14/531,139

(22) Filed: Nov. 3, 2014

(65) Prior Publication Data

US 2016/0123306 A1 May 5, 2016

(51) Int. Cl.
*F03D 1/06* (2006.01)
*F03D 80/70* (2016.01)

(52) U.S. Cl.
CPC ........... *F03D 1/0658* (2013.01); *F03D 80/70* (2016.05); *F03D 1/065* (2013.01); *F03D 1/0675* (2013.01); *F03D 1/0691* (2013.01); *F05B 2260/79* (2013.01); *Y02E 10/721* (2013.01)

(58) Field of Classification Search
CPC .... F03D 1/0658; F03D 11/0008; F03D 80/70; F03D 1/065; F03D 1/0675; F03D 1/0691; F05B 2260/79
See application file for complete search history.

(56) References Cited

U.S. PATENT DOCUMENTS

| 4,061,073 | A  | * | 12/1977 | Easter | F16B 31/028 |
| | | | | | 280/756 |
| 6,663,314 | B2 | * | 12/2003 | Bequet | B64C 1/12 |
| | | | | | 403/408.1 |
| 7,517,194 | B2 | * | 4/2009 | Doorenspleet | F03D 1/0658 |
| | | | | | 416/204 R |
| 8,066,490 | B2 | | 11/2011 | Babu et al. | |
| 8,408,875 | B2 | * | 4/2013 | Quell | F03D 1/0658 |
| | | | | | 416/204 R |
| 9,464,622 | B2 | * | 10/2016 | Caruso | F03D 1/0658 |
| 2007/0231146 | A1 | * | 10/2007 | Birkemeyer | F03D 1/0658 |
| | | | | | 416/204 R |
| 2010/0124474 | A1 | * | 5/2010 | Jacobsen | F03D 1/0658 |
| | | | | | 411/427 |
| 2014/0079555 | A1 | | 3/2014 | Seufert et al. | |

* cited by examiner

*Primary Examiner* — Woody Lee, Jr.
*Assistant Examiner* — Behnoush Haghighian
(74) *Attorney, Agent, or Firm* — Dority & Manning, P.A.

(57) ABSTRACT

The present disclosure is directed to a rotor blade assembly for a wind turbine that controls pitch bearing load distribution. The assembly includes a rotor blade having a body shell extending between a blade root and tip, a pitch bearing at an interface between the blade root and a hub of the wind turbine, and plurality of blade bolts coupling the blade root to the hub through the pitch bearing. The pitch bearing includes an outer bearing race and an inner bearing race rotatable relative to the outer race. Thus, in one embodiment, the blade bolts couple the blade root to the hub through the inner race of the pitch bearing. Further, each of the blade bolts has a first end and a second end defining a length therebetween and at least two of the blade bolts have varying lengths so as to distribute loads experienced by the pitch bearing.

17 Claims, 7 Drawing Sheets

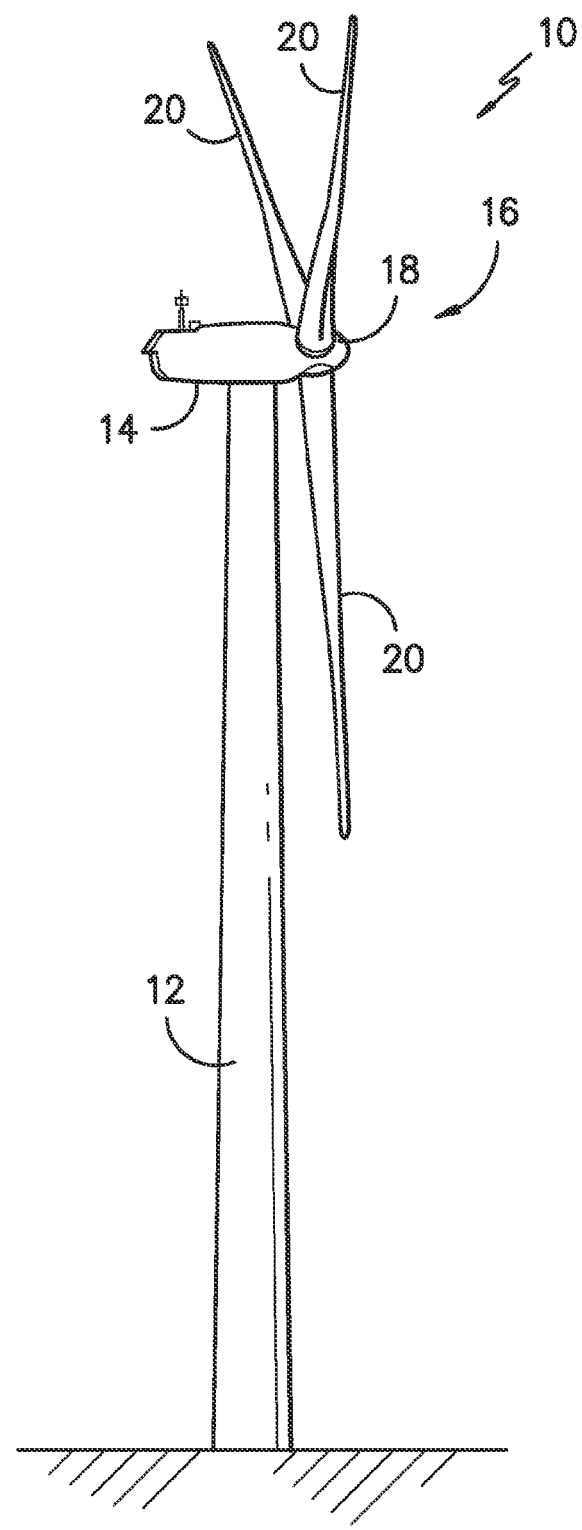
FIG. -1-

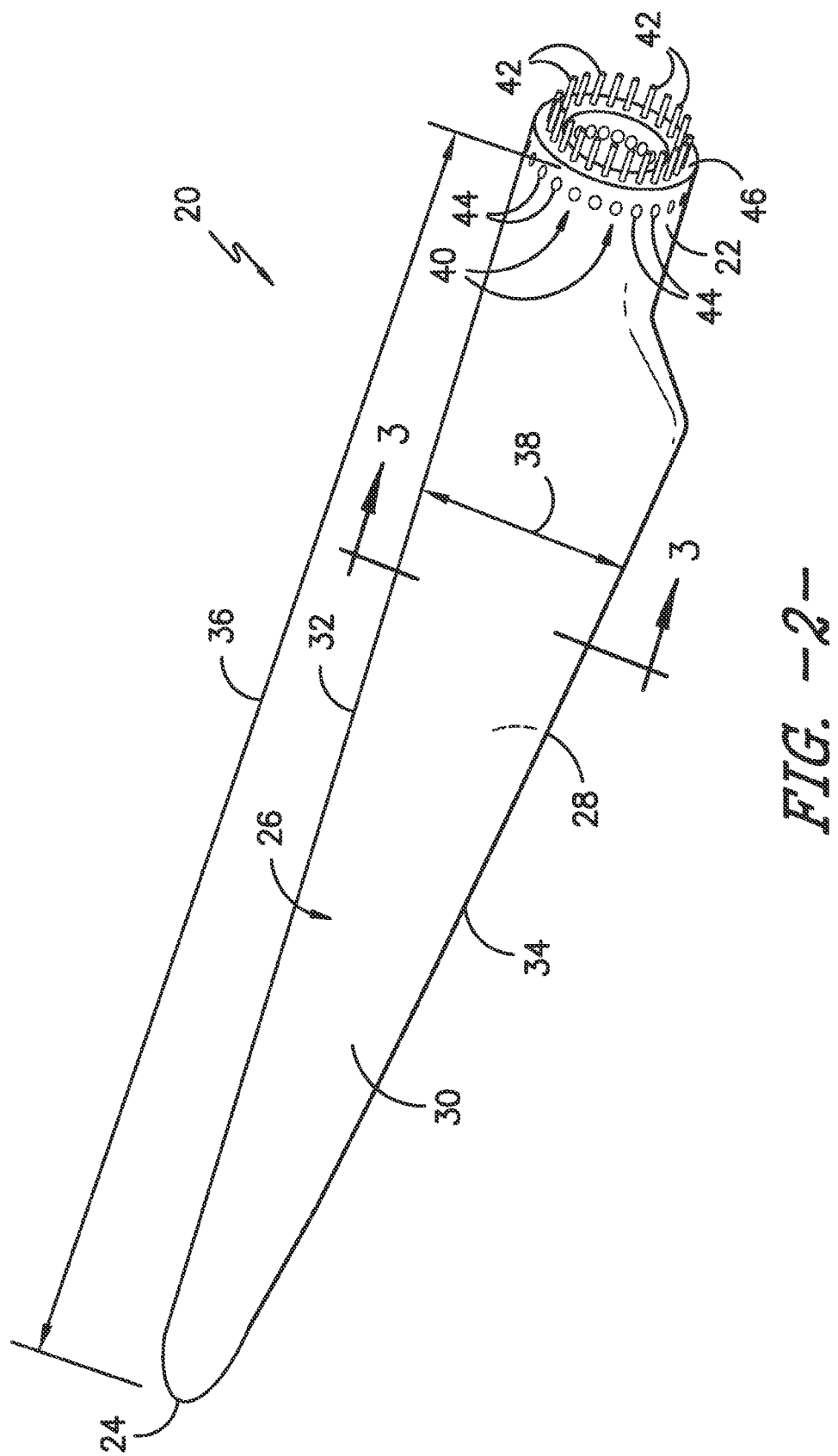
FIG. -2-

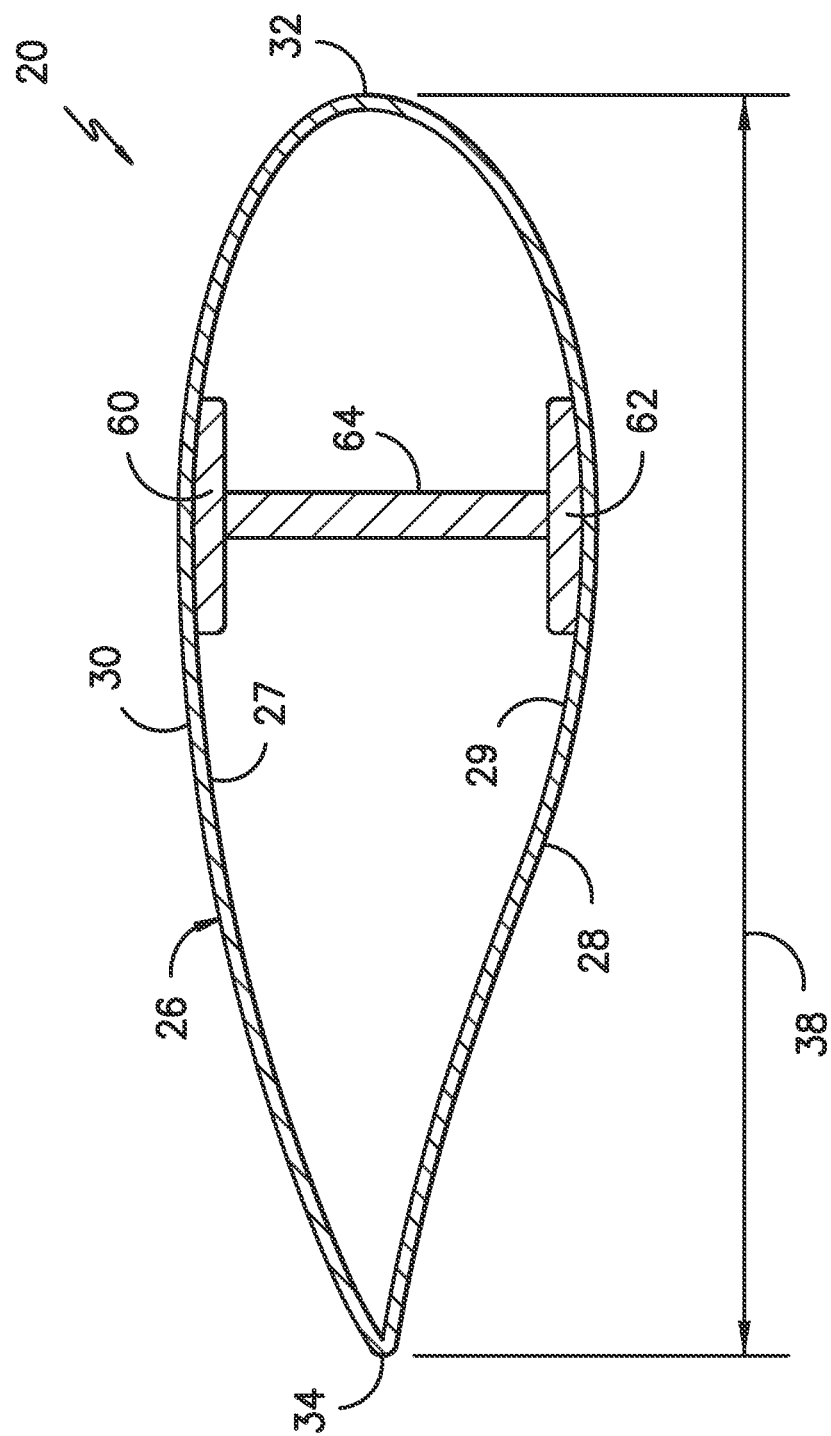
FIG. -3-

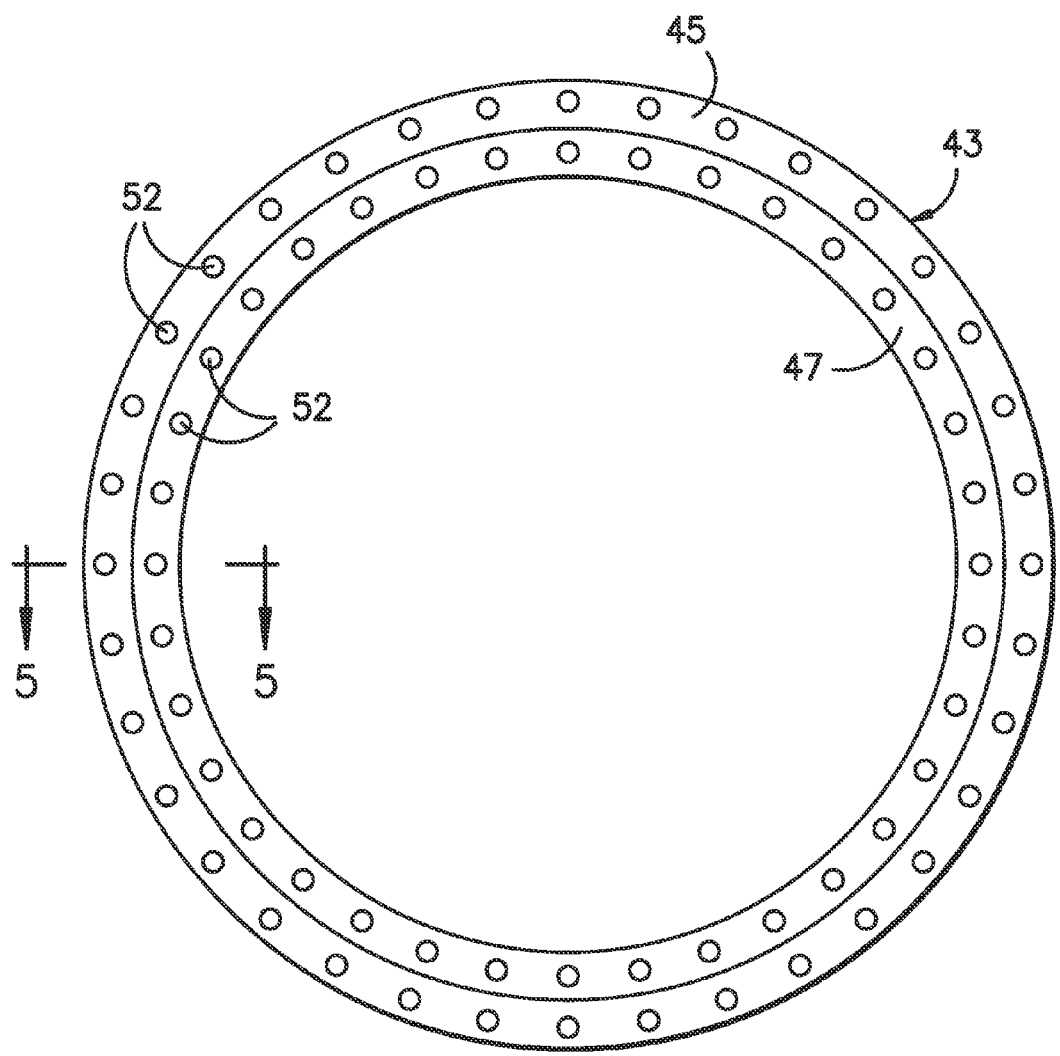
FIG. -4-
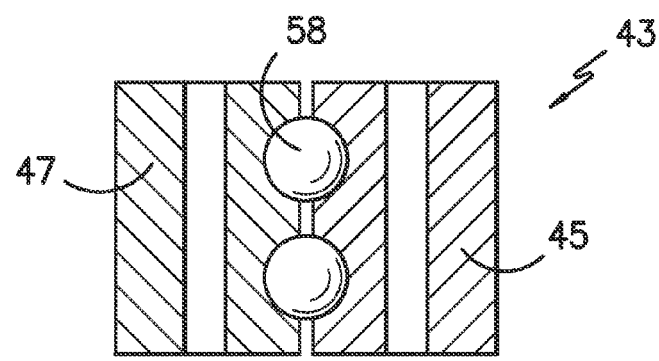
FIG. -5-

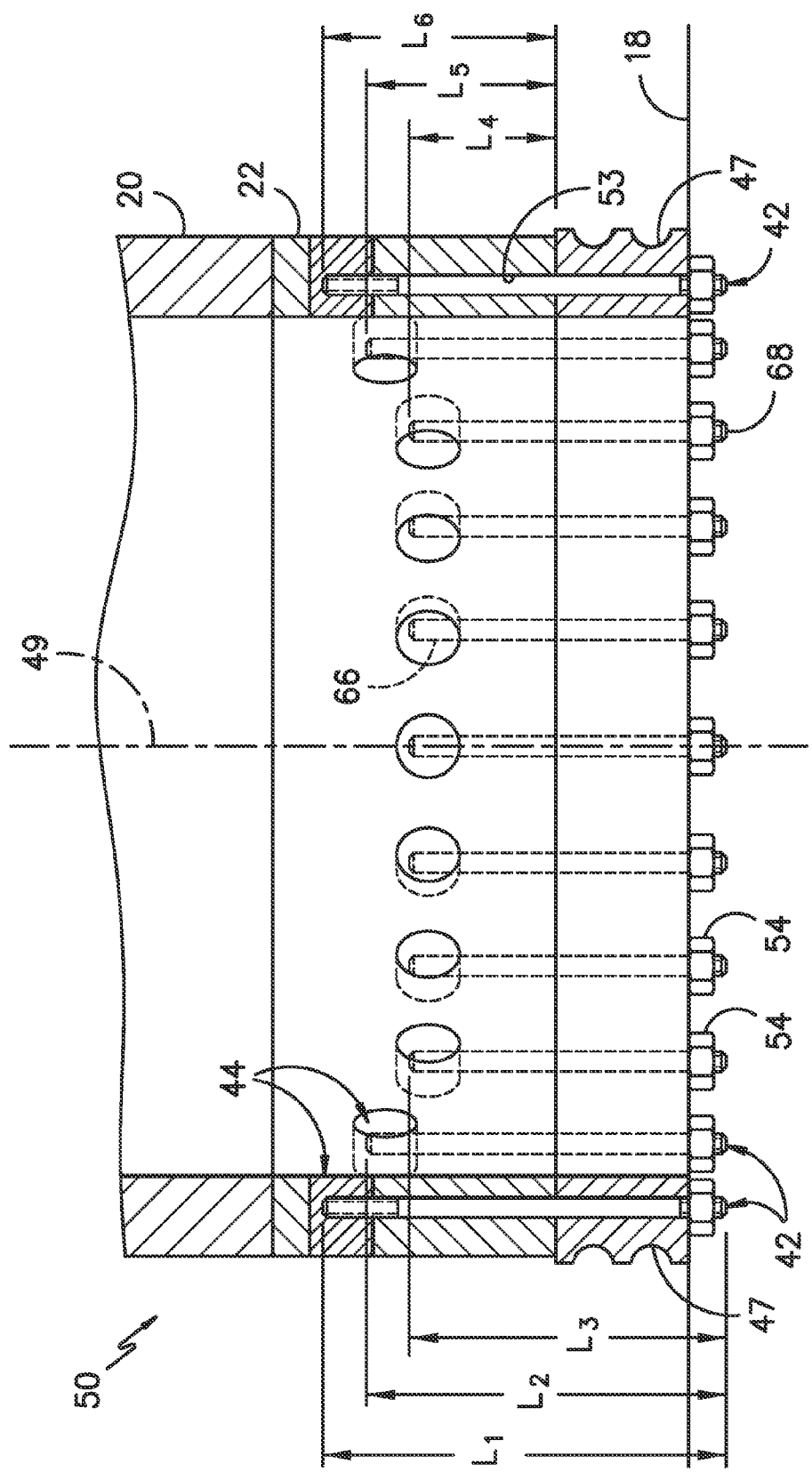

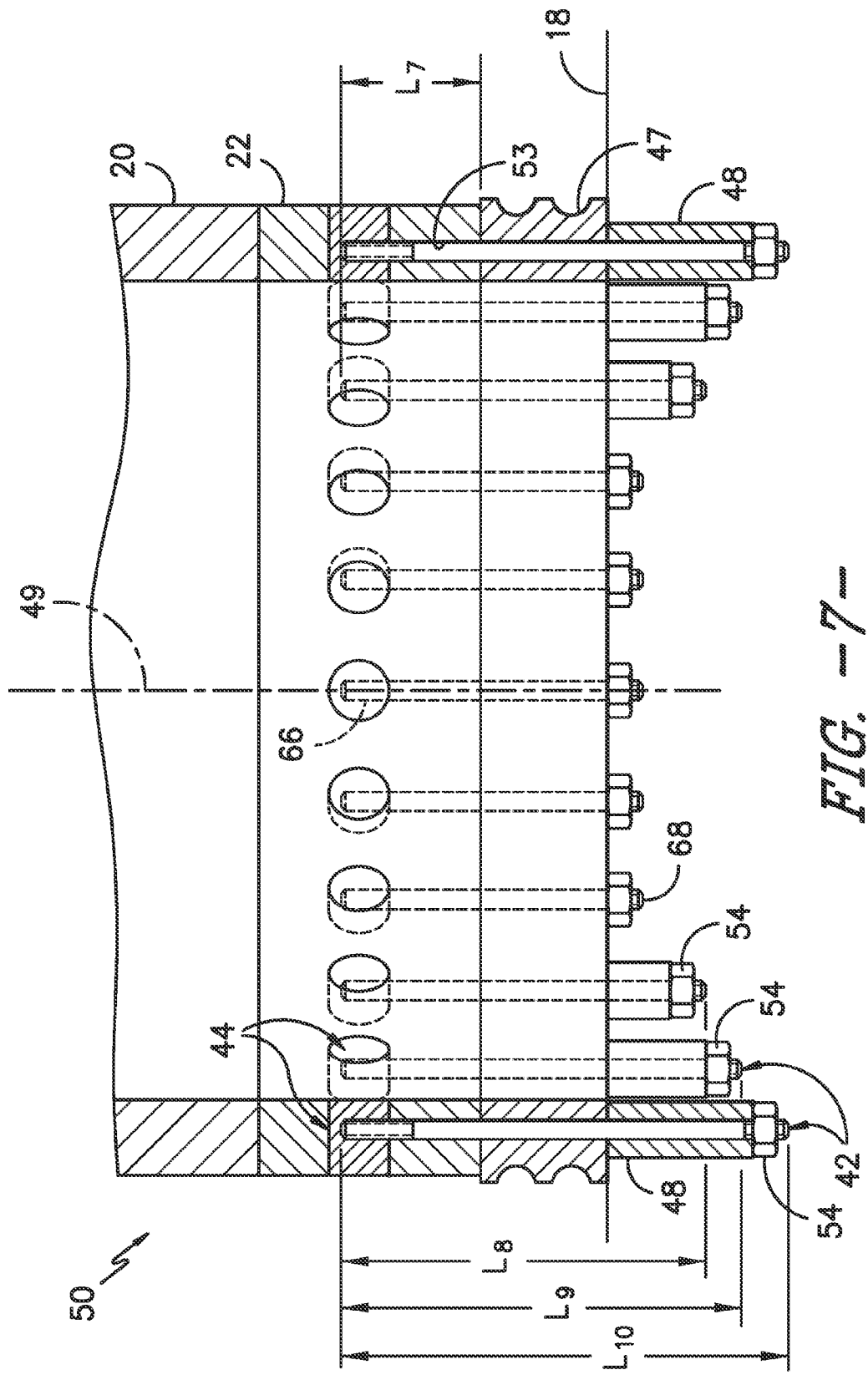
FIG. -7-

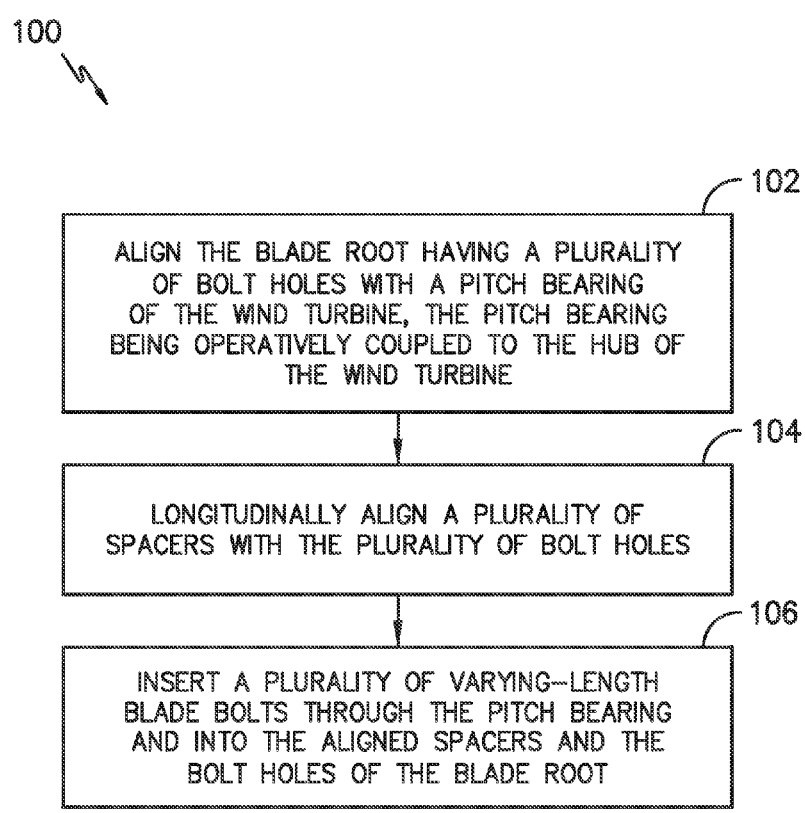
FIG. -8-

ROTOR BLADE ASSEMBLY FOR A WIND TURBINE HAVING VARIABLE-LENGTH BLADE BOLTS

FIELD OF THE INVENTION

The present subject matter relates generally to wind turbines and, more particularly, to a rotor blade assembly for a wind turbine having variable-length blade bolts.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During operation of a wind turbine, the loads acting on a rotor blade are transmitted through the blade and into the blade root. Thereafter, the loads are transmitted through a pitch bearing disposed at the interface between the rotor blade and the wind turbine hub. Typically, the hub has a much higher stiffness than the rotor blades. Thus, due to the stiffness differential between the hub and the rotor blades, the pitch bearings are often subjected to extreme, varying and/or opposing loads. For example, the inner race of each pitch bearing (i.e., the portion coupled to the rotor blades) may be subjected to varying, localized loads resulting from flapwise or edgewise bending of the rotor blades, whereas the outer race of each pitch bearing (i.e., the portion coupled to the hub) may be subjected to lower and/or differing loads. Such a variation in loading across the inner and outer races can result in substantial damage to and/or failure of the pitch bearings.

To address uneven load distribution, many modern wind turbines employ stiffener plates and/or rings. Such plates and rings, however, add complexity to the rotor blade and can be both heavy and expensive. In addition, the stiffener plates and/or rings are not always effective at providing even load distribution to the pitch bearing.

Accordingly, an improved rotor blade assembly configured to more evenly distribute loads would be welcomed in the technology. More specifically, an improved rotor blade assembly having variable blade bolt lengths that provide improved pitch bearing load distribution would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly includes a rotor blade including a body shell extending between a blade root and a blade tip, a pitch bearing configured at an interface between the blade root and a hub of the wind turbine, and plurality of blade bolts configured to couple the blade root to the hub through the pitch bearing. The pitch bearing includes an outer bearing race and an inner bearing race rotatable relative to the outer race. Thus, in one embodiment, the blade bolts are configured to couple the blade root to the hub through the inner race of the pitch bearing. Further, each of the blade bolts has a first end and a second end defining a length therebetween. Accordingly, at least two of the blade bolts have varying lengths so as to distribute loads experienced by the pitch bearing.

For example, in one embodiment, the plurality of blade bolts include a first set of blade bolts having a first length and a second set of blade bolts having a second length, wherein the first length is greater than the second length. In another embodiment, the blade root includes a plurality of bolt holes configured to receive the plurality of blade bolts. In a particular embodiment, the bolt holes may have varying lengths so as to accommodate the blade bolts of varying lengths. Alternatively, the bolt holes may have uniform lengths. In such an embodiment, the assembly may include a plurality of spacers longitudinally aligned with the plurality of uniform-length bolt holes, wherein the plurality of spacers are configured to accommodate the blade bolts of varying lengths. In various embodiments, the spacers may all have the same length or may have varying lengths.

In certain embodiments, a plurality of barrel nuts may be configured with the first ends of the plurality of blade bolts. In addition, a plurality of attachment nuts may be configured with the second ends of the plurality of blade bolts so as to secure the blade bolts within the bolt holes.

In another aspect, the present disclosure is directed to a system for controlling load distribution in a pitch bearing of a wind turbine. The system includes a plurality of blade bolts configured to couple a blade root of a rotor blade to a hub of the wind turbine through the pitch bearing. Each of the plurality of blade bolts includes a first end and a second end defining a length therebetween, with the first ends configured to extend within bolt holes of the blade root. The system also includes a plurality of fastening nuts (e.g. barrel nuts and/or attachment nuts) configured to retain the plurality of blade bolts within the bolt holes of the blade root. Further, at least two of the blade bolts have varying lengths so as to distribute loads experienced by the pitch bearing.

In another embodiment, the system may also include a plurality of spacers configured to longitudinally align with the plurality of bolt holes of the blade root. Thus, the spacers are configured to accommodate the varying lengths of the blade bolts. Alternatively, the bolt holes of the blade root may have varying lengths to accommodate the varying lengths of blade bolts.

In yet another aspect, the present disclosure is directed to a method for stiffening a connection between a rotor blade and a hub of a wind turbine. The method includes aligning a blade root of the rotor blade with a pitch bearing of the wind turbine, the pitch bearing being operatively coupled to the hub of the wind turbine, the blade root comprising a plurality of bolt holes. Another step includes longitudinally aligning a plurality of spacers with the plurality of bolt holes. The method also includes inserting a plurality of varying-length blade bolts through the pitch bearing and into the aligned spacers and bolt holes. Thus, the varying-length blade bolts are configured to evenly distribute loads experienced by the pitch bearing.

In one embodiment, the plurality of bolt holes may have varying lengths. Alternatively, the plurality of bolt holes may have uniform lengths. In such an embodiment, the method may further include longitudinally aligning a plurality of spacers with the plurality of bolt holes and inserting one of the blade bolts through each of the aligned spacers and bolt holes, wherein the plurality of spacers are configured to accommodate blade bolts of varying lengths. In certain embodiments, the plurality of spacers may have uniform or varying lengths, depending on the varying lengths of the blade bolts.

In certain embodiments, the method may include inserting first ends of the plurality of blade bolts into a plurality of barrel nuts located within the blade root of the rotor blade. Further, the method may also include securing the plurality of blade bolts via a plurality of attachment nuts coupled with second ends of the plurality of blade bolts.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one of the rotor blades of the wind turbine shown in FIG. 1;

FIG. 3 illustrates a cross-sectional view of the rotor blade of FIG. 2 along line 3-3;

FIG. 4 illustrates a top view of one embodiment of a pitch bearing according to the present disclosure;

FIG. 5 illustrates a cross-sectional view of the pitch bearing of FIG. 4 along line 5-5;

FIG. 6 illustrates a partial, cross-sectional view of one embodiment of a rotor blade assembly, particularly illustrating the blade root connected to the hub through the pitch bearing via a plurality of varying-length blade bolts and corresponding varying-length bolt holes according to the present disclosure;

FIG. 7 illustrates a partial, cross-sectional view of another embodiment of the rotor blade assembly, particularly illustrating the blade root connected to the hub through the pitch bearing via a plurality of varying-length blade bolts and spacers; and FIG. 8 illustrates a flow diagram of one embodiment of a method for installing a rotor blade to a hub of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a rotor blade assembly for a wind turbine having blade bolts of variable lengths so as to more evenly distribute loads acting on the pitch bearing. More specifically, the rotor blade assembly includes a rotor blade having a blade root and a blade tip, a pitch bearing configured at an interface between the blade root and a hub of the wind turbine, and plurality of blade bolts configured to couple the blade root to the hub through the pitch bearing. Further, at least two of the blade bolts have varying lengths so as to evenly distribute loads experienced by the pitch bearing. In addition, the blade root includes a plurality of bolt holes configured to receive the blade bolts. In a particular embodiment, the bolt holes may have varying lengths so as to accommodate the blade bolts of varying lengths. In such an embodiment, the bolt holes may have uniform lengths. As such, in an alternative embodiment, the assembly may include a plurality of spacers longitudinally aligned with the plurality of bolt holes of uniform lengths, wherein the spacers are configured to accommodate the blade bolts of varying lengths. Accordingly, the loads transmitted through the rotor blade and into the pitch bearing may be more evenly distributed, thereby protecting the pitch bearing from uneven or excessive loads which may result in bearing failure.

The present disclosure has many advantages not present in the prior art. For example, the present disclosure is a cost effective solution that replaces expensive stiffener plates and/or rings, thereby minimizing the size and/or weight of the rotor blade assembly. In addition, the present disclosure alleviates the costs associated with pitch bearing failure and provides a pitch bearing designed for a 20-year life.

Referring now to the drawings, FIG. 1 illustrates a perspective view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced.

Referring now to FIG. 2, a perspective view of one of the rotor blades 20 shown in FIG. 1 is illustrated in accordance with aspects of the present subject matter. As shown, the rotor blade 20 includes a blade root 22 configured for mounting the rotor blade 20 to the hub 18 of the wind turbine 10 (FIG. 1) and a blade tip 24 disposed opposite the blade root 22. A body shell 26 of the rotor blade 20 may extend lengthwise between the blade root 22 and the blade tip 24 and may generally serve as the outer shell of the rotor blade 20. As is generally understood, the body shell 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body shell 26 may generally include a pressure side 28 and a suction side 30 extending between a leading edge 32 and a trailing edge 34. Additionally, the rotor blade 20 may have a span 36 defining the total length of the body shell 26 between the blade root 22 and the blade tip 24 and a chord 38 defining the total length of the body shell 26 between the leading edge 32 and the trailing edge 34. As is generally understood, the chord 38 may vary in length with respect to the span 36 as the body shell 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 44 mounted within a portion of the blade root 22 and a blade bolt 42 coupled to and extending from the barrel nut 44 so as to project outwardly from a root end 46 of the blade root 22. By projecting outwardly from the root end 46, the blade bolts 42 may generally be used to couple the blade root 22 to the hub 18 (e.g., via a pitch bearing 43 (FIG. 4)), as will be described in greater detail below.

Referring now to FIG. 3, a cross-sectional view of the rotor blade 20 of FIG. 2 along line 3-3 is illustrated. As shown, the rotor blade 20 may also include one or more longitudinally extending structural components configured to provide increased stiffness, buckling resistance and/or strength to the rotor blade 20. For example, the rotor blade 20 may include a pair of longitudinally extending spar caps 60, 62 configured to be engaged against the opposing inner surfaces 27, 29 of the pressure and suction 28, 30 of the body shell 26, respectively. Additionally, one or more shear webs 64 may be disposed between the spar caps 60, 62 so as to form a beam-like configuration. The spar caps 60, 62 may generally be designed to control the bending stresses and/or other loads acting on the rotor blade 20.

Referring generally to FIGS. 4-7, the rotor blades 20 are typically attached to the hub 18 of the wind turbine 10 through a pitch bearing 43. For example, as shown is FIGS. 4 and 5, the pitch bearing 43 includes an outer bearing race 45 and an inner bearing race 47 rotatable relative to the outer race 45. More specifically, in certain embodiments, the inner race 47 is rotatable relative to the outer race 45 via a plurality of roller elements 58 disposed between the outer and inner races 45, 47. The outer race 45 may generally be configured to be mounted to the hub 18 using a plurality of hub bolts (not shown) and/or other suitable fastening mechanisms. Similarly, the inner race 47 may be configured to be mounted to the blade root 22 using the blade bolts 42 and corresponding bolt holes 52 (FIGS. 6 and 7). In addition, each rotor blade 20 may include pitch adjustment mechanism (not shown) that rotates each rotor blade 20 about the pitch axis 49. For example, each pitch adjustment mechanism may include a pitch drive motor, a pitch drive gearbox, and a pitch drive pinion. In such an embodiment, the pitch drive motor may be coupled to the pitch drive gearbox so that the pitch drive motor imparts mechanical force to the pitch drive gearbox. Similarly, the pitch drive gearbox may be coupled to the pitch drive pinion for rotation therewith. The pitch drive pinion may, in turn, be in rotational engagement with the pitch bearing 43 coupled between the hub 18 and a corresponding rotor blade 20 such that rotation of the pitch drive pinion causes rotation of the pitch bearing 43. Thus, in such embodiments, rotation of the pitch drive motor drives the pitch drive gearbox and the pitch drive pinion, thereby rotating the pitch bearing 43 and the rotor blade 20 about the pitch axis 49.

Referring particularly to FIGS. 6 and 7, several views of a rotor blade assembly 50 suitable for mounting one of the rotor blades 20 to the hub 18 of the wind turbine 10 is illustrated in accordance with aspects of the present subject matter. FIG. 6 illustrates a partial, cross-sectional view of one embodiment of the rotor blade assembly 50, particularly illustrating the blade root 22 connected to the hub 18 through the pitch bearing 43 via a plurality of varying-length blade bolts 42 and corresponding varying-length bolt holes 52. FIG. 7 illustrates a partial, cross-sectional view of another embodiment of the rotor blade assembly 50, particularly illustrating the blade root 22 connected to the hub 18 through the pitch bearing 43 via a plurality of varying-length blade bolts 42 and spacers 48. In addition, as shown, only the inner race 47 of the pitch bearing 43 is depicted to better illustrate various details of the embodiments.

For example, the plurality of blade bolts 42 may each extend between a first end 66 and a second end 68 defining a length therebetween. The first end 66 of each blade bolt 42 may be configured to be coupled to the blade root 22 via the barrel nut 44 of each root attachment assembly 40. Specifically, the first end 66 of each blade bolt 42 may extend into and may be secured within an axially extending, threaded opening defined through at least a portion of each barrel nut 44. Alternatively, the first end 66 of each blade bolt 42 may simply extend into the blade root 22 and the barrel nut 44 may be absent. The second end 68 of each blade bolt 42 may be configured to be coupled to a portion of the inner race 47, such as by coupling the second end 68 to the inner race 47 using an attachment nut 54 and/or other suitable fastening mechanism.

In addition, as shown particularly in FIG. 6, the blade bolts 42 have varying lengths, as illustrated by $L_1$, $L_2$, and $L_3$, in order to evenly distribute loads around the bearing 43. For example, as load follows the path of most resistance, stiffer components in the load path take more of the load than softer components. Thus, in a typical wind turbine, a majority of the load in the rotor blade 22 is transferred to the pitch bearing 43 through the spar caps 60, 62. The remainder of the blade root 22 is much softer causing a high percentage of the load being transferred into a small portion of the roller elements 58. Therefore, by varying the lengths of the blade bolts 42 so as to stiffen the soft components or soften the stiff components of the pitch bearing 43, the loads can be more evenly distributed over more of the roller elements 58, thereby decreasing the stress per element 58.

Accordingly, as shown in FIG. 6, the rotor blade assembly 50 includes longer soft bolts in the direction of the spar caps 60, 62 and shorter hard bolts opposite to the spar caps 60, 62. It should be noted that all bolts connecting the rotor blade 20 to the pitch bearing 43 (both "hard" and "soft") should be oriented in the same direction, i.e. longitudinal to the span 36. In a particular embodiment, the shorter bolts (i.e. the "hard" bolts) are located in line with the leading and trailing edge regions of the blade root 22, whereas the longer bolts (i.e. the "soft" bolts) are located near or behind the spar caps 60, 62. As used herein, the term "soft" is used to describe less stiff bolts, whereas the term "hard" is used to describe more stiff bolts. For example, the longer bolts are less stiff than the short bolts because stiffness is inversely proportional to length. As such, the load can be transferred from the spar caps 60, 62 to the hard bolts so as to distribute the load more evenly around the bearing 43. In addition, the blade root 22 includes a plurality of bolt holes 53 configured to receive the blade bolts 42. For example, as shown, the bolt holes 53 have varying lengths (e.g. $L_4$, $L_5$, and $L_6$) so as to accommodate the blade bolts 42 having corresponding varying lengths.

Alternatively, as shown in FIG. 7, the bolt holes 53 may have uniform or constant lengths (e.g. $L_7$). In such an embodiment, the assembly 50 may also include one or more spacers 48 longitudinally aligned with the plurality of bolt holes 53 of uniform lengths. Thus, as shown, the spacers 48 are configured to accommodate the blade bolts 42 of varying lengths (e.g. $L_8$, $L_9$, $L_{10}$). In various embodiments, the spacers 48 may all have the same length or may have varying lengths (as shown). For example, as shown in the illustrated embodiment, the spacers 48 have three different lengths so as to accommodate blade bolts 42 of at least three different lengths. In still further embodiments, the assembly 50 may include spacers 48 have more than three or less than three lengths.

In additional embodiments, it should be understood that any number of the blade bolts 42 may be used to mount the blade root 22 to the hub 18. Further, the blade bolts 42 may have any number of varying lengths in order to evenly distribute the loads around the bearing 43. For example, in a particular embodiment, at least two of the blade bolts 42 have varying lengths so as to distribute loads experienced by the pitch bearing 43. In still a further embodiment, more than two blade bolts 43 may have varying lengths (e.g. three) in order to achieve the desired load distribution in the bearing 43. In yet another embodiment, the blade bolts 42 may include a first set of blade bolts having a first length and a second set of blade bolts having a second length, wherein the first length is greater than the second length.

Referring now to FIG. 8, a flow diagram of one embodiment of a method 100 for stiffening a connection between a rotor blade and a hub of a wind turbine is illustrated. As shown, at 102, the method 100 includes aligning a blade root of the rotor blade with a pitch bearing of the wind turbine, the pitch bearing being operatively coupled to the hub of the wind turbine, the blade root comprising a plurality of bolt holes. At 104, the method 100 includes longitudinally aligning a plurality of spacers with the plurality of bolt holes. At 106, the method 100 includes inserting a plurality of varying-length blade bolts through the pitch bearing and into the aligned spacers and bolt holes of the blade root. Thus, the varying-length blade bolts are configured to distribute loads experienced by the pitch bearing.

In a further embodiment, the method may also include longitudinally aligning a plurality of spacers with the plurality of bolt holes and inserting one of the blade bolts through each of the aligned spacers and bolt holes, wherein the plurality of spacers are configured to accommodate the varying-length blade bolts. In another embodiment, the method includes inserting the first ends of the plurality of blade bolts into a plurality of barrel nuts located within the blade root of the rotor blade. Further, the method may include securing the plurality of blade bolts via a plurality of attachment nuts coupled with the second ends of the plurality of blade bolts.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
    a rotor blade including a body shell extending between a blade root and a blade tip;
    at least one spar cap extending at least partially between the blade root and the blade tip along a span of the rotor blade;
    a pitch bearing configured at an interface between the blade root and a hub of the wind turbine, the pitch bearing comprising an outer bearing race and an inner bearing race rotatable relative to the outer race; and,
    a plurality of blade bolts configured to couple the blade root to the hub through the pitch bearing, each of the blade bolts comprising a first end and a second end defining a length therebetween, the plurality of blade bolts defining a first set of blade bolts near the spar cap and a second set of blade bolts substantially in line with the leading and trailing edge regions of the blade root; wherein each of the first set of blade bolts having a length longer than each of the second set of blade bolts.

2. The rotor blade assembly of claim 1, wherein the plurality of blade bolts are configured to couple the blade root to the hub through the inner race of the pitch bearing.

3. The rotor blade assembly of claim 1, wherein the plurality of blade bolts comprise a first set of blade bolts having a first length and a second set of blade bolts having a second length, wherein the first length is greater than the second length.

4. The rotor blade assembly of claim 1, wherein the blade root comprises a plurality of bolt holes, each of the bolt holes configured to receive one of the plurality of blade bolts.

5. The rotor blade assembly of claim 4, wherein the bolt holes comprise varying lengths.

6. The rotor blade assembly of claim 4, wherein the bolt holes comprise uniform lengths.

7. The rotor blade assembly of claim 6, further comprising a plurality of spacers longitudinally aligned with the plurality of uniform-length bolt holes, wherein the plurality of spacers are configured to accommodate blade bolts of varying lengths.

8. The rotor blade assembly of claim 7, wherein the one or more spacers comprise varying lengths, wherein longer spacers are located near the spar cap and shorter spacers are located in line with the leading and trailing edge regions of the blade root.

9. The rotor blade assembly of claim 1, further comprising a plurality of barrel nuts configured with the first ends of the plurality of blade bolts.

10. The rotor blade assembly of claim 1, further comprising a plurality of attachment nuts configured with the second ends of the plurality of blade bolts.

11. A method for stiffening a connection between a rotor blade and a hub of a wind turbine, the method comprising:
    aligning a blade root of the rotor blade with a pitch bearing of the wind turbine, the pitch bearing being operatively coupled to the hub of the wind turbine, the blade root comprising a plurality of bolt holes;
    longitudinally aligning a plurality of spacers with the plurality of bolt holes; and,
    inserting a plurality of varying-length blade bolts through the pitch bearing and into the aligned spacers and bolt holes, the plurality of blade bolts defining a first set of blade bolts near a spar cap, the spar cap extending at least partially between the blade root and a blade tip along a span of the rotor blade, and a second set of blade bolts substantially in line with the leading and trailing edge regions of the blade root;

wherein each of the first set of blade bolts having a length longer than each of the second set of blade bolts.

12. The method of claim 11, wherein the plurality of bolt holes comprise varying lengths.

13. The method of claim 11, wherein the plurality of bolt holes comprise uniform lengths.

14. The method of claim 13, wherein the plurality of spacers are configured to accommodate the varying-length blade bolts.

15. The method of claim 14, wherein the plurality of spacers comprise varying lengths, wherein longer spacers are located near the spar cap and shorter spacers are located in line with the leading and trailing edge regions of the blade root.

16. The method of claim 15, further comprising inserting first ends of the plurality of blade bolts into a plurality of barrel nuts located within the blade root of the rotor blade.

17. The method of claim 16, further comprising securing the plurality of blade bolts via a plurality of attachment nuts coupled with second ends of the plurality of blade bolts.

* * * * *